United States Patent [19]

Nikolskaja et al.

[11] Patent Number: 5,656,069
[45] Date of Patent: Aug. 12, 1997

[54] SELECTIVE CARBON FILTER

[75] Inventors: Elena J. Nikolskaja; Natalia W. Maltzeva; Elena W. Loseva; Evgenia B. Koroljeva, all of Sankt Petersburg, Russian Federation

[73] Assignee: MST Micro-Sensor Technologie GmbH, Hohenschaftlarn, Germany

[21] Appl. No.: 320,962

[22] Filed: Oct. 12, 1994

[30] Foreign Application Priority Data

Oct. 12, 1993 [DE] Germany .................. 43 34 767.3

[51] Int. Cl.$^6$ .................. B01D 53/04; B29C 43/52
[52] U.S. Cl. .................. 96/4; 95/47; 95/51; 95/901; 264/122; 264/319; 264/349; 264/DIG. 48; 210/694; 210/502.1
[58] Field of Search .................. 264/109, 122, 264/319, 349, DIG. 48, 29.5, 29.7; 210/503, 694, 502.1; 95/901, 45, 50, 47, 51; 55/DIG. 5; 96/4

[56] References Cited

U.S. PATENT DOCUMENTS

| | | | |
|---|---|---|---|
| 3,015,367 | 1/1962 | Smith et al. | 264/122 |
| 5,118,329 | 6/1992 | Kosaka et al. | 95/901 |
| 5,256,476 | 10/1993 | Tanaka et al. | 95/901 |
| 5,332,426 | 7/1994 | Tang et al. | 55/DIG. 5 |
| 5,431,864 | 7/1995 | Rao et al. | 264/29.7 |

FOREIGN PATENT DOCUMENTS 0400526  5/1990  European Pat. Off. .
2407887  8/1974  Germany .

OTHER PUBLICATIONS

European Search Report.
Database WPI, Week 9018, Derwent Publ. Ltd, AN 90–134562 & JP–A–2 080 314, Osaka Gas KK, Mar. 1990.
Database WPI, Week 8117, Derwent Publ. AN 81–29779D & JP–A–56 022 617, Nippon Jidosha Buhin Sog et al, Mar. 1981.

Primary Examiner—Mathieu D. Vargot
Attorney, Agent, or Firm—Felfe & Lynch

[57] ABSTRACT

A filter material from active carbon compacts is prepared by the following steps:

(a) mixing active carbon powder with polyvinyl alcohol powder in the ratio of 9:1 to 3:1, (b) mixing the powder from step (a) with distilled water or a mixture of distilled water and ethyl alcohol, (c) shaping tablets and similar articles in a mold under pressure, and (d) successively heating the tablets at
1) 40° to 80° C. for 3 to 6 hours,
2) 80° to 120° C. for 10 to 14 hours.

A filter material according to the invention for the selective separation of organic material from an organic phase consists of active carbon compacts thus prepared and is used for the selective separation of organic and inorganic phases.

17 Claims, No Drawings

SELECTIVE CARBON FILTER

BACKGROUND OF THE INVENTION

The present invention relates to a method for preparing filter material from active carbon compacts, the filter material itself, and its use for the selective separation of organic and inorganic phases.

There is still a great demand for filter materials which are capable of selectively separating organic and inorganic phases, and which are easy and inexpensive to make. Objects of the present invention are therefore to provide such filter materials and a process for their preparation. Still further subject matter of the present invention is the use of the filter materials according to the invention for the selective separation of inorganic and organic phases.

THE INVENTION

The objects are achieved by a method for preparing filter materials from active carbon compacts which enable the selective separation of organic and inorganic phases. The method for the separation of organic and inorganic substances using carbon filter material is applied to various classes of organic compounds, such as alcohols, ketones, aromatic hydrocarbons and inorganic compounds such as $H_2$, $NH_3$, $AsH_3$, $PH_3$, NO, CO in a vapor-gas mixture (VGM) in a concentration range up to 200 mg. per cubic meter for organic and as low as 0.01 ppm for inorganic substances. For example, it is important to measure detrimental gases concentration ($NH_3$, CO, etc.) in a vapor-gas mixture. However, such a mixture often contains other substances, such as isopropanol (IPA) or benzol, which hinder measurement. In this case a pellet of filter material is put on the head of a sensitive element of a gas detector. The pellet allows the component to be determined (e.g. $NH_3$, CO) to pass through and sorbes IPA or benzol (see Table 1). The separation can be conducted under essentially normal pressure conditions.

The term "active carbon" as used herein should be understood to mean and/or includes "activated coal." Activated coal for filter pellets production has micropores (dimension less than 1.6 nm) of volume not less than 0.25 $cm^3$ per gram, and mesopores (dimension in the range from 1.6 to 100 nm) and a volume not less than 0.13 $cm^3$ per gram. The mesopores specific surface area is not less than 130 $m^2$ per gram. Activated coal can be produced from mine coal, peat coal or charcoal. High absorption activity of the activated coal surface with respect to organic substances determines effective separation of the organic and inorganic substances.

A filter material of the invention can be prepared by mixing active carbon powder with polyvinyl alcohol powder in the ratio of 9:1 to 3:1 to form a powder mixture. The powder mixture is mixed with either distilled water alone or a mixture of distilled water and ethyl alcohol. In preferred embodiments, the mass ratio of the powder mixture to the distilled water or mixture of distilled water and ethyl alcohol is 1:1 to 1:2 and the mass ratio of distilled water to ethyl alcohol is 10:0 to 10:2. The resulting mass is shaped into, i.e. tablets or similar articles, in a mold under pressure, and successively heated at 1) 40° to 80° C. for 3 to 6 hours, 2) 80° to 120° C. for 10 to 14 hours.

The drying of pellets is conducted in order to fix their form and provide mechanical strength and stability. These improvements are conditioned by clutch of particles by solidified PVA. The drying operation leads also to dehydration of activated coal surface pores to provide its sorption activity. Further exposure of pellets to an atmosphere with 50% relative humidity has little influence on their absorption properties with respect to hydrocarbon vapor. The drying of pellets can be conducted in a drying chamber using atmospheric air with no forced circulation.

In a preferred embodiment, the method of filter pellet preparation includes stirring, in a rotating drum or in a vessel with a frame stirring device, activated coal powder with particles size in the range 10–50 nm with a) polyvinyl alcohol (PVA) powder with particle size up to 100 mcm followed by water addition to 35–45% mass humidity, and/or b) a solution, produced by dissolving PVA particles having a size up to 200 mcm in boiling water or in water on boiling followed by pressing and thermal treatment of pellets.

In deciding whether to employ a) or b) above in preparation of the filter material, it is important to consider the granulometric constitution of the PVA powder (see Tables 1 and 2).

When shaping the tablets or similar articles, the pressing operation is preferably performed at about room temperature, i.e. 15°–35° C., for a period of 20–40 seconds, and preferably for 30 seconds, at a pressure of from 20 to 80 $kg/cm^2$ and in an especially preferred embodiment at a pressure of about 50 $kg/cm^2$.

The selection of the type of mold for making the compacts is optional and depends on the intended use. The precise pressure that is applied is governed by the desired porosity of the compact that is favorable for the particular application. The skilled practitioner can determine this by simple preliminary experiment or on the basis of the ratios of the amounts of the substances to be separated. It is furthermore possible to prepare compacts with pores and at particular ratios of pore size to compact size, and with an optimal amount of pores. This too will depend on the kind of application and can be optimized by preliminary experiments.

The separation of the organic and inorganic phases is based on vapor-gas mixture diffusion through the canals or chambers in the pellet, which is accompanied by simultaneous sorption of organic substances by the activated coal which is the basic component of the filter. These canals with a diameter ($d_c$) of 1.1–1.5 mm have a volume ($V_c$) in the range 2–4% of the pellet volume ($V_p$) and offer optimal separation of organic an inorganic substances due to unequal sorption activity of the coal in regard to these substances. So determined part of free volume (relative volume of the canals $V_c$ divided by $V_p$) insure the inorganic substances pass through the canals to the sensitive element of the gas analyzer. Organic substance sorption is realized in the micro- and mesopores, which are characteristic for certain classes of coal as discussed above. Due to the high sorption rate of the coal, organic substances are completely consumed at pellet thickness of not less than 5 mm even in case of pellet with canals 1–1.5 mm in diameter or the equivalent.

Additional subject matter of the present invention is a filter material for the selective separation of organic material from an inorganic phase, wherein the filter material according to the invention consists of the active carbon compacts prepared by the method of the invention.

The present invention is further explained by the following example.

EXAMPLE

For the preparation of active carbon filters according to the invention the following steps are performed:

1. Mixing active carbon powder with powder of polyvinyl alcohol until homogeneity is obtained. The mass ratio of active carbon to polyvinyl alcohol is in the range from 9:1 to 3:1. The active carbon particles should have a size in the range from 10 to 50 μm.
2. Mixing the said components with a mixture of distilled water and ethyl alcohol in the mass ratio of 10:0 to 10:2.
3. Preparation of tablets using a tableting mold or any other mold. The above-described mass is pressed to tablets at a pressure of 20 to 80 kg/cm². This pressure is maintained for 30 seconds. All mixing operations are performed very carefully until full homogeneity is obtained.
4. Heating of the tablets successively first to a temperature of 60° C. for 4 to 5 hours, then to a temperature of 100° C. for 12 hours.

A filter pellet, containing activated coal and PVA in mass relation 4:1 having a diameter of 18.8 mm, a thickness 5 mm, part of free volume in regard to canals 2.3%, canal diameter $d_c$=1.3 mm, number of canals n=5 is brought into contact with a vapor-gas mixture containing IPA in a concentration up to 200 mg per cubic meter and ammonia in a concentration of about 60 ppm at 20°±5° C. and pressure 760±30 mm mercury. IPA hinders determination of $NH_3$ concentration with a gas analyzer, so it is necessary to absorb IPA selectively permitting $NH_3$ to pass through. The pellet is placed on the head of the sensitive element of the gas analyzer. After 3 minutes following the beginning of contact, the concentrations in air determined after the pellet by the chromatographic method are 0 mg per cubic meter for IPA and 50 ppm for $NH_3$. Sorption for IPA is 100%, while the transmittance for ammonia is 83%. The organic component is separated by activated coal, but the inorganic component sorption is considerably less. The degree of separation is 83%.

The following tables show typical results and characteristics:

TABLE 1

PVA content influence on filter pellets physical and chemical characteristics (Vc/Vp = 2.3%, dc = 1.3 mm)

| Activated coal to PVA relation | Pellet bend strength, kg/sq. cm | Static adsorbtion capacity, % mass | | | Organic compound concentration behind the pellet, mg/m3 | | | | | | | | | Time before detection of gas behind the pellet | | |
|---|---|---|---|---|---|---|---|---|---|---|---|---|---|---|---|---|
| | | | | | IPA | | | Benzol | | | Aceton | | | | | |
| | | IPA | Benzol | Aceton | 1 day | 2 days | 14 days | 1 day | 2 days | 14 days | 1 day | 2 days | 14 days | NH3 | AsH3 | CO |
| 9:1 | 9.2 | 21.5 | 39.0 | 28.5 | 0.20 | 1.2 | 3.0 | 0.15 | 1.3 | 3.5 | 0.11 | 1.1 | 3.6 | 10" | 5" | 8" |
| 4:1 | 11.5 | 19.3 | 37.3 | 27.1 | 0.25 | 1.3 | 3.5 | 0.19 | 1.4 | 3.7 | 0.13 | 1.7 | 3.8 | 8" | 4" | 7" |
| 3:1 | 12.0 | 15.2 | 34.6 | 24.3 | 0.25 | 1.7 | 4.0 | 0.18 | 1.5 | 4.3 | 0.13 | 1.3 | 3.9 | 5" | 4" | 5" |

Testing conditions:

organic substance starting concentration before pellet 150 ± 10 mg/m3

CO and NH3 concentration before pellet 60 ppm

AsH3 concentraton before pellet 0.06 ppm

TABLE 2

Introduction of PVA method influence on physical and chemical characteristics of pellets (activated coal to PVA mass relation 9:1, pellet thickness 5 mm, diameter 18.9 mm, part of free volume Vc/Vp = 2.3%, canals diameter 1.30 mm)

| PVA characteristics | Pellet bend strength kg/cm2 | Static adsorption capacity % mass | | | IPA concentration behind the pellet after 14 days |
|---|---|---|---|---|---|
| | a) PVA powder | IPA | Benzol | Aceton | days |
| particle size <100 mcm | 9.2 | 20.8 | 34.7 | 28.5 | 3,7 |
| particle size <200 mcm | 2.8 | 21.2 | 36.1 | 26.3 | 3.8 |
| b) PVA powder (particle size up to 200 mcm) water solution | | | | | |
| Solution concentration 10% mass | 12.0 | 21.4 | 35.2 | 28.7 | 4,2 |
| Solution concentration 5% mass | 10.0 | 21.6 | 38.1 | 28.9 | 3,4 |

TABLE 3

Part of free volume (Vc/Vp) of filter pellets influence on organic and anorganic substances separation in VGM (d = 19.0 ± 0.2 mm)

| Part of free volume Vc/Vp % | Canals diameter, mm | Number of canals | Organic substance concentration behind the pellet mg/m3 | | | | | | Anorganic substance concentration behind the pellet, ppm | | | | | | | | |
|---|---|---|---|---|---|---|---|---|---|---|---|---|---|---|---|---|---|
| | | | IPA | | Benzol | | Aceton | | NH3 | | | AsH3 | | | CO | | |
| | | | 1 day | 14 days | 1 day | 14 days | 1 day | 14 days | 1' | 2' | 3' | 1' | 2' | 3' | 1' | 2' | 3' |
| 1.6 | 1.1 | 5 | 0.21 | 3.3 | 0.20 | 3.1 | 0.22 | 3.5 | 28 | 42 | 45 | 0.01 | 0.03 | 0.04 | 20 | 46 | 48 |
| 2.3 | 1.3 | 5 | 0.25 | 3.2 | 0.24 | 3.0 | 0.26 | 3.5 | 31 | 46 | 50 | 0.01 | 0.03 | 0.04 | 20 | 48 | 51 |
| 4.2 | 1.5 | 5 | 0.30 | 3.5 | 0.30 | 3.7 | 0.31 | 3.8 | 32 | 48 | 52 | 0.01 | 0.04 | 0.04 | 21 | 48 | 53 |

Testing conditions:
organic substance starting concentration before pellet 150 ± 10 mg/m3
CO and NH3 concentration before pellet 60 ppm
AsH3 concentration before pellet 0.06 ppm It will be understood that the specification and examples are illustrative but not limitative of the present invention and that other embodiments within the spirit and scope of the invention will suggest themselves to those skilled in the art.

We claim:

1. A process for the preparation of filter material from active carbon comprising:
   (a) mixing active carbon powder with polyvinyl alcohol powder in a ratio of 9:1 to 3:1 to form a powder mixture;
   (b) mixing the powder mixture with a liquid phase of distilled water or a mixture of distilled water and ethyl alcohol to form a mass;
   (c) shaping the mass in a mold under pressure; and
   (d) successively heating the shaped mass at
      1) 40° to 80° C. for 3 to 6 hours,
      2) 80° to 120° C. for 10 to 14 hours.

2. The process of claim 1 wherein the liquid phase is distilled water.

3. The process of claim 1 wherein the liquid phase is a mixture of water and ethyl alcohol with a mass ratio of 10:0 to 10:2.

4. The process of claim 1 wherein the mixtures (a) and (b) are used in a mass ratio of 1:1 to 1:2.

5. The process of claim 1 wherein step (c) is performed with a pressure of 20 to 80 kg/cm$^2$.

6. The process of claim 5 wherein the pressure is maintained for 20 to 40 seconds.

7. The process of claim 1 wherein the active carbon powder has a size range of 10 to 50 microns.

8. A process for the preparation of filter material capable of selectively separating organic and inorganic phases, the process comprising:
   (a) mixing active carbon powder with polyvinyl alcohol powder in a ratio of 9:1 to 3:1 to form a powder mixture;
   (b) mixing the powder mixture with a liquid phase of distilled water or a mixture of distilled water and ethyl alcohol to form a mass;
   (c) shaping the mass in a mold under pressure; and
   (d) successively heating the shaped mass at
      1) 40° to 80° C. for 3 to 6 hours,
      2) 80° to 120° C. for 10 to 14 hours.

9. A filter material for the selective separation of organic material from an inorganic phase, comprising an active carbon compact produced by the process comprising:
   (a) mixing active carbon powder with polyvinyl alcohol powder in a ratio of 9:1 to 3:1 to form a powder mixture;
   (b) mixing the powder mixture with distilled water or a mixture of distilled water and ethyl alcohol to form a mass;
   (c) shaping the mass in a mold under pressure; and
   (d) successively heating the shaped mass at
      1) 40° to 80° C. for 3 to 6 hours,
      2) 80° to 120° C. for 10 to 14 hours.

10. A method of selectively separating organic and inorganic phases comprising: contacting a substance containing an organic and inorganic phase with a filter material produced by the process comprising:
    (a) mixing active carbon powder with polyvinyl alcohol powder in a ratio of 9:1 to 3:1 to form a powder mixture;
    (b) mixing the powder mixture with distilled water or a mixture of distilled water and ethyl alcohol to form a mass;
    (c) shaping the mass in a mold under pressure; and
    (d) successively heating the shaped mass at
       1) 40° to 80° C. for 3 to 6 hours,
       2) 80° to 120° C. for 10 to 14 hours.

11. The process of claim 8 wherein the liquid phase is distilled water.

12. The process of claim 8 wherein the liquid phase is a mixture of water and ethyl alcohol with a mass ratio of 10:0 to 10:2.

13. The process of claim 8 wherein the mixtures (a) and (b) are used in a mass ration of 1:1 to 1:2.

14. The process of claim 8 wherein step (c) is performed with a pressure of 20 to 80 kg/cm$^2$.

15. The process of claim 14 wherein the pressure is maintained for 20 to 40 seconds.

16. The process of claim 8 wherein the active carbon powder has a size range of 10 to 50 microns.

17. The filter material of claim 9 wherein the active carbon compact has canals.

* * * * *

UNITED STATES PATENT AND TRADEMARK OFFICE
CERTIFICATE OF CORRECTION

PATENT NO. : 5,656,069
DATED : August 12, 1997
INVENTOR(S) : NIKOLSKAJA et al.

It is certified that error appears in the above-identified patent and that said Letters Patent is hereby corrected as shown below:

In column 2, line 50, after "organic" change "an" to -- and --.

In column 4, Table 2, in the figures below the caption "IPA . . . 14 days", in each instance, change "," to -- . --.

In columns 5-6, Table 3, line 1 of the heading, change "anorganic" to -- inorganic --.

columns 5-6, Table 3, line 1 of the righthandmost subheading, change "Anorganic" to -- Inorganic --.

In Claim 13, column 6, line 53, change "ration" to -- ratio --.

Signed and Sealed this

Fourth Day of January, 2000

Attest:

Attesting Officer

*Acting Commissioner of Patents and Trademarks*